United States Patent [19]

Bochkabev et al.

[11] Patent Number: 5,057,198
[45] Date of Patent: Oct. 15, 1991

[54] METHOD AND ELECTROLYZER FOR SOFTENING WATER

[75] Inventors: Gely R. Bochkarev, Alexandr V. Beloborodov; Galina I. Pushkareva, all of Novosibirsk, U.S.S.R.

[73] Assignee: Institut Gornogo Dela Sibirskogo Otdelenia Akademii Nauk SSSR, Novosibirsk, U.S.S.R.

[21] Appl. No.: 460,902
[22] PCT Filed: May 19, 1989
[86] PCT No.: PCT/SU89/00124
§ 371 Date: Feb. 8, 1990
§ 102(e) Date: Feb. 8, 1990
[87] PCT Pub. No.: WO89/11453
PCT Pub. Date: Nov. 30, 1989

[30] Foreign Application Priority Data

May 19, 1988 [SU] U.S.S.R. ............... 4420088

[51] Int. Cl.$^5$ .......... B01D 17/06; B01D 61/42; B03C 5/00; C25B 1/00
[52] U.S. Cl. ............ 204/186; 204/182.1; 204/182.3; 204/301
[58] Field of Search ............ 204/182.1, 182.3, 186

[56] References Cited

U.S. PATENT DOCUMENTS 3,515,664  1/1967  Johnson et al. ............ 204/182.3
4,124,458  11/1978  Moeglich ............ 204/182.3

*Primary Examiner*—John F. Niebling
*Assistant Examiner*—Caroline Koestner
*Attorney, Agent, or Firm*—Lilling & Lilling

[57] ABSTRACT

The invention relates to the field of water purification. A method for softening water by way of its electrochemical treatment involves causing water to pass in the form of two streams through anode and cathode chambers of a membrane electrolyzer. According to the invention, the water stream being fed to the anode chamber is preliminarily softened before supplying it to the anode chamber, and this stream is in the form of catholyte after the separation of precipitating hardness salts therefrom, anolyte being used as the end product. An electrolyzer for softening water has a casing divided by membranes into anode and cathode chambers, respectively. According to the invention, anodes are spaced from the membrane, and perforation holes of a cathode are in the form of slits extending about perpendicularly with respect to the water flow direction, and projections are provided on the surface of the cathode facing towards the interior of the cathode chamber inbetween the slits, the leading faces of the projections in the flow direction being inclined at an agle of 20° to 40° with respect to the surface of the membranes.

The invention may be used in any fields where water softening is required.

1 Claim, 2 Drawing Sheets

METHOD AND ELECTROLYZER FOR SOFTENING WATER

BACKGROUND OF THE INVENTION

1. Field of the Invention

The invention relates to water processing, and, in particular, it is concerned with a method for softening water by way of an electrochemical treatment, and an electrolyzer for carrying out the method.

2. Description of the Related Art

Known in the art is a method for softening water by adding reagents, e.g. lime in the form of lime milk to water being softened. Hardness salts turn to insoluble form and can be separated from water being softened in the form of a precipitate by setting or filtering (cf. Construction Norms and Rules. Water Supply. Outside Networks and Installation (in Russian). SNiP 2.04.84. 1985, Moscow, pp. 108-109). The known method does not allow a desired degree of softening of water to be achieved. The residual hardness can only be lowered to 0.5-1 mg-eq./l using auxiliary methods such as adding soda and heating water to 35°-40° C. In addition, the known method involves the use of reagent adding equipment, mixers, suspended bed clarifiers and apparatuses for stabilizing treatment of water and coagulants. In other words, the known method for softening water using chemicals calls for sophisticated equipment including a large number of individual components.

Also known in the art is a method for softening water by way of electrochemical treatment, comprising causing water to pass in the form of two streams through a membrane electrolyzer, one stream being caused to pass through an anode chamber to produce anolyte, the other stream being caused to pass through a cathode chamber to produce catholyte from which precipitating hardness salts are separated, combining catholyte and anolyte together and using the joint flow as the end product (cf. Jr. "Vodosnabzhenie i sanitarnaya tekhnika", 1982, No. 4, pp. 7-8). The prior art method can only lower hardness of water to 0.8-1.2 mg-eq./l, i.e. the method is essentially a method of prepurification of water prior to, e.g. a sodium-cationite method of water softening, and water being softened is supplied, after its treatment in the membrane electrolyzer, to an ion-exchange apparatus in which it is treated using the sodium-cationite method.

This prior art method calls for the use of chemically pure reagent NaCl, HCl so that the method is rather expensive. In addition, a high water consumption for washing is required. This method is generally used for softening water with a low hardness.

Known in the art is an electrolyzer for softening water, comprising a casing divided by a membrane into flow-through chambers: an anode chamber having an anode accommodated therein and a cathode chamber having a cathode accommodated therein, the anode and cathode being in the form of plates, pressed against the membrane on either side, and separated therefrom with respective electrically insulating layers, the anode and cathode and the electrically insulating layers having perforations (SU, A, 882944).

The prior art electrolyzer provides a poor quality of purification in the anode chamber as the anode prevents cations from passing from the anode chamber to the cathode chamber, the positively charged ions being repelled from the anode, i.e. such electrolyzers are substantially pH electrocoagulators. In additon, manufacture and assembly of the electrolyzer call for a high accuracy of coaxial perforation holes since if they are misaligned the holes are partly covered so as to reduce the working surface area of the membrane.

Most intensive electrolysis occurs inside the perforation holes in view of minimum electrical resistance which is especially pronounced with a large thickness of electrodes, e.g. when graphite electrodes are used. However, this results in clogging of the membrane in the zones of the holes with electrolysis products so as to lower reliability of the electrolyzer in operation.

SUMMARY OF THE INVENTION

The invention is based on the problem of providing a method for softening water by way of an electrochemical treatment having such a sequence of treatment steps as to ensure the production of water with a hardness of 0.2 to 0.3 mg-eq./l in a single softening stage without using auxiliary means and also of providing an electrolyzer for carrying out such a method in which a cathode is so constructed as to substantially decrease clogging of perforation holes during the electrochemical water softening thus enhancing quality of water softening.

This problem is solved by a method for softening water by way of its electrochemical treatment, comprising the steps of causing water to pass in the form of two streams through a membrane electrolyzer, one stream being caused to pass through an anode chamber to produce anolyte, the other stream being caused to pass through a cathode chamber to produce a catholyte from which precipitating hardness salts are separated, wherein, according to the invention, the water stream to be fed to the anode chamber is preliminarily softened before feeding to the anode chamber, and for that purpose this stream is in the form of at least a part of the stream of catholyte after the separation of precipitating hardness salts therefrom, the anolyte being used as the end product.

The problem is also solved by an electrolyzer for softening water, comprising a casing divided by a membrane into flow-through chambers; an anode chamber accommodating an anode and a cathode chamber accommodating a cathode which is pressed against the membrane, an electrically insulating layer being provided between the cathode and membrane and perforation holes being made in the cathode and electrically insulating layer. According to the invention, the anode is positioned in a spaced relation to the membrane, the perforation holes of the cathode and electrically insulating layer being in the form of slots extending about perpendicularly with respect to the direction of water flow, elongated projections being provided on the cathode surface facing towards the interior of the cathode chamber to extend in between the slits and therealong, the leading faces of the projections in the direction of flow being inclined at 20° to 40° with respect to the surface of the membrane.

To enlarge the working surface of the membrane, through holes having their axes perpendicular with respect to the surface of the membrane are preferably provided in the body of the projections.

The method for softening water by way of its electrochemical treatment, according to the invention, allows water with a hardness of 0.2 to 0.3 mg-eq./l to be produced in a single treatment stage without using auxiliary treatment methods such as sodium-cationization; it is simple and features high reliability.

The electrolyzer for water softening, according to the invention, which is used to carry out the method, according to the invention, is simple in structure, features a high throughput capacity and reliability in operation. Positioning the anode in a spaced relation to the membrane allows cations to flow unobstructedly through the membrane into the cathode chamber in which the water stream is preliminarily softened when it passes through the cathode chamber. The provision of the perforation holes in the form of slits and projections in between the slits having included streamlined surfaces in the direction of flow contributes to the intensive washing of products of electrolysis off the surfaces of the membrane owing to enhanced hydrodynamic conditions of flow in the zone of the perforation holes. The provision of through holes in the body of the projections ensures an increase in the working surface of the membrane, hence, enhances throughput capacity of the electrolyzer.

BRIEF DESCRIPTION OF THE DRAWINGS

The invention will now be described in detail with reference to the accompanying drawings, in which.

DESCRIPTION OF THE PREFERRED EMBODIMENTS

A method for softening water consists in the following. Water to be softened is caused to pass in the form of two streams through a membrane electrolyzer. One stream is caused to pass through an anode chamber to produce anolyte and the other stream is caused to pass through a cathode chamber to produce catholyte from which precipitating hardness salts are separated. The stream of water fed to the anode chamber is preliminarily softened, and for that purpose this stream is at least partially of catholyte after the separation of precipitating hardness salts therefrom, the anolyte being used as the end product.

Figure 1:
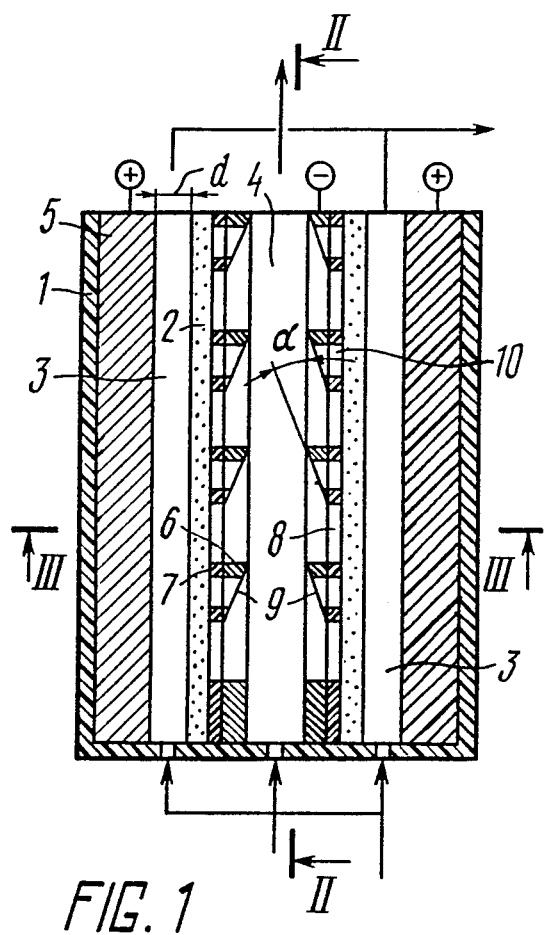
FIG. 1 is a diagrammatic view of an electrolyzer for softening water, according to the invention, in longitudinal section.
Figure 2:
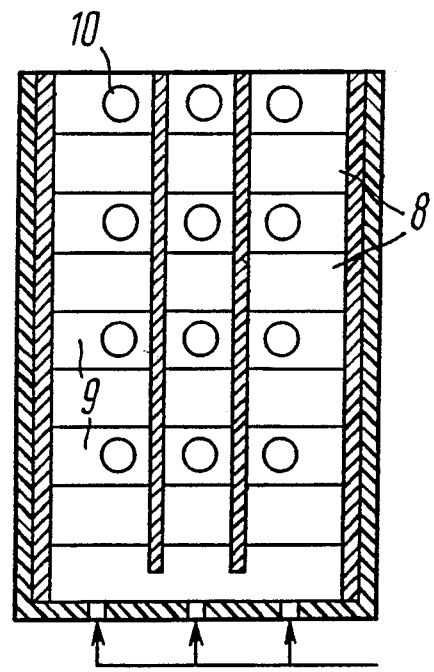
FIG. 2 is a sectional view taken along line II—II in FIG. 1.
Figure 3:
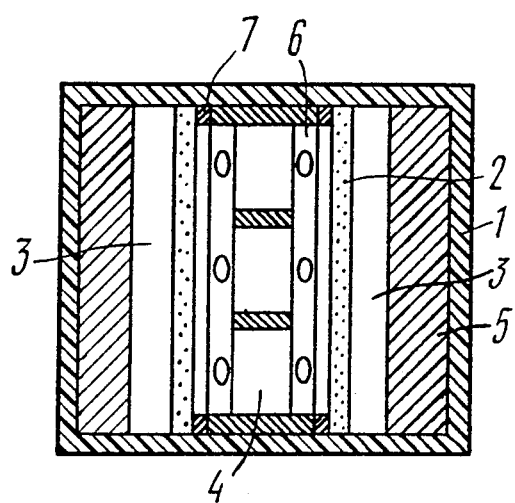
FIG. 3 is a sectional view taken along line III—III in FIG. 1.

The method for softening water, according to the invention, is carried out using an electrolyzer for softening water shown in FIGS. 1, 2, 3.

An electrolyzer for softening water comprises an insulating rectangular casing 1 divided by means of two parallel membranes 2 into three flow-through chambers: a pair of lateral anode chambers 3 and a central cathode chamber 4 located therebetween. Each anode chamber 3 has an anode 5 in the form of a plate of an electrically conducting material which is positioned at a distance d from the membrane 2. A cathode 6 is box-shaped to the configuration of the cathode chamber 4 and has its opposed walls pressed against the membrane 2, an electrically insulating layer 7 being provided between each of these walls and the respective membrane 2. Perforation holes 8 in the form of slits (which are referred to below as slits 8) are made in the electrically insulating layers 7 and in the walls of the cathode 6 adjoining thereto, the slits extending perpendicularly with respect to the flow of water through the cathode chamber 4. Elongated projections 9 are provided in between the slits 8 on the surface of the cathode 6 facing towards the interior of the cathode chamber 4 to extend along the slits 8, the leading faces of the projections in the direction of flow being inclined at an angle $\alpha = 20°-40°$ with respect to the surface of the membrane 2. Through holes 10 having their axes perpendicular with respect to the surface of the membranes 2 are made in the body of the projections 9. The cathode 6 also has ridges 11.

The electrolyzer shown in FIGS. 1, 2, 3 functions in the following manner. Water to be softened is caused to pass through the electrolyzer in the form of three streams: one, central stream is caused to pass through the cathode chamber 4, and the two lateral streams are caused to pass through respective anode chambers 3.

Direct current is supplied to the electrodes—the anodes 5 and cathode 6 (the power supply is not shown). Calcium and magnesium ions that make water hard are caused to move under the action of direct current from the anode chambers 3 into the cathode chamber 4 through the membranes 2 which are made, e.g. of a belting-type cloth and through perforation holes or slits 8 in the cathode 6 and insulating layers 7. Anolyte is thus softened. Owing to water electrolysis in the cathode chamber 4, catholyte is alkalized to a pH from 10.5 to 11.5. Calcium and magnesium ions turn to insoluble hydroxides and carbonates at the abovementioned pH values. Water electrolysis occurs only on the inner surface of the cathode 6 as the outer surface thereof, which is pressed against the membranes 2, is protected by means of the electrically insulating layers 7. As a result, the membranes 2 are not clogged with products of electrolysis on the surfaces of the cathode 6 facing towards the membranes 2.

The provision of the projections 9 on the inner surface of the cathode 6 in between the slits 8 with the leading faces of the projections in the direction of flow inclined at an angle $\alpha = 20°-40°$ with respect to the surface of the membrane 2 makes it possible to ensure hydrodynamics of the flow such that no dead zones are formed in the slits 8 of the cathode 6, and electrolysis products in the form of precipitating hardness salts and gas bubbles are readily removed with the flow from the surfaces of the membranes 2. The angle $\alpha$ of inclination of the faces of the projections 9 with respect to the surface of the membranes 2 was chosen by way of experiments. If the angle is greater than $\alpha = 40°$, the removal of electrolysis products is inadequate, and with an angle $\alpha$ smaller than $20°$ a substantial overlap (decrease) of the useful area of the membranes 2 occurs so that the projections become ineffectual.

The provision of the through holes 10 in the body of the projections 9, the axes of the holes being perpendicular with respect to the surface of the membranes 2, allows the working area of the membranes 2 to be enlarged so as to enhance throughput capacity of the electrolyzer.

Figure 4:
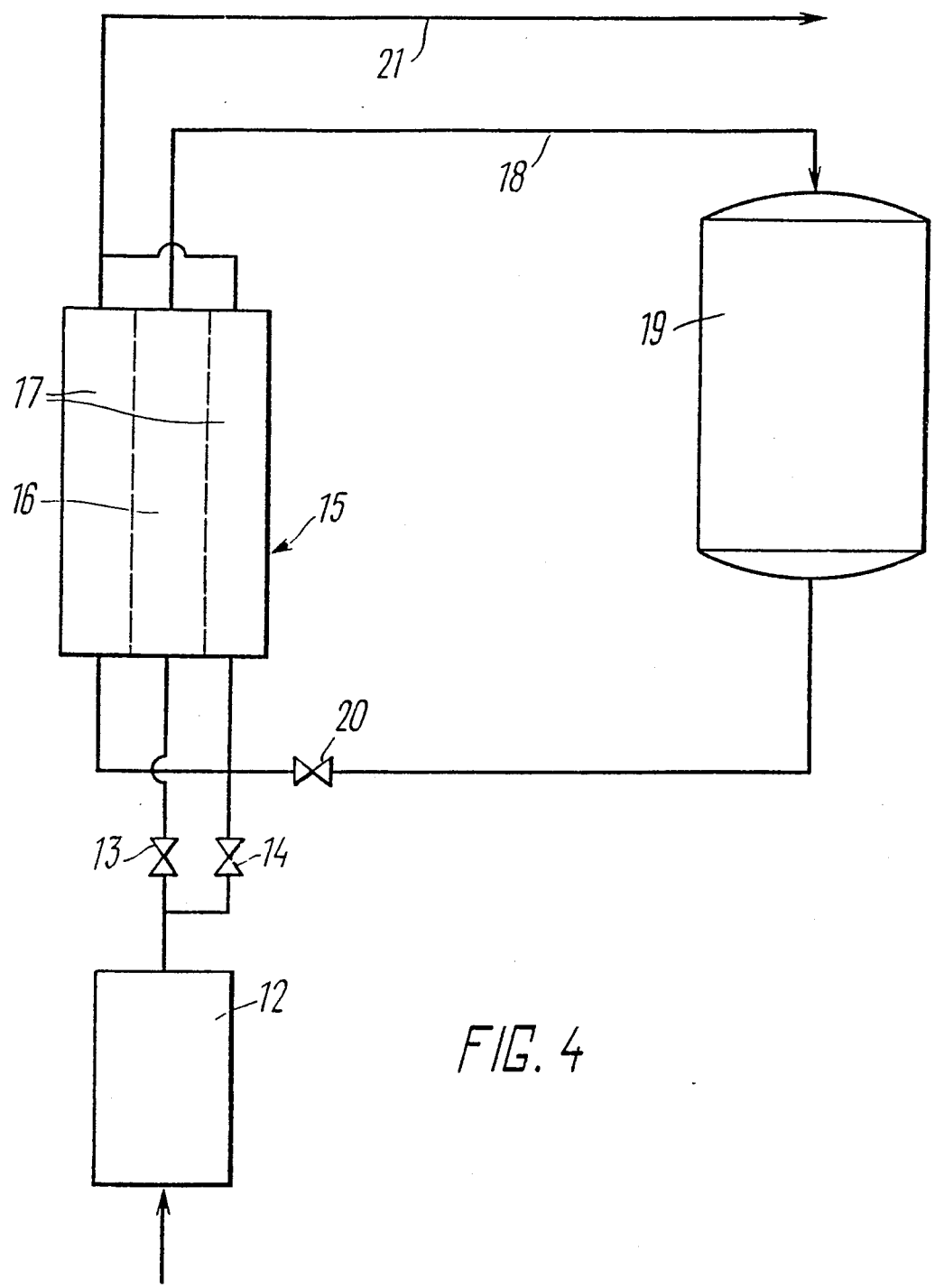
FIG. 4 is a diagrammatic view of a plant for carrying out a method for softening water, according to the invention.

The method for softening water, according to the invention, was carried out using a plant shown in FIG. 4.

The plant has a water heater 12 having an inlet connected to a line for supplying water to be softened and an outlet communicating, via a pair of pipelines having valves 13, 14, respectively, with an electrolyzer 15 for softening water which has a cathode chamber 16 and a pair of anode chambers 17. Inlets of the cathode chamber 16 and anode chamber 17 communicate with the outlet of the heater 12 through the valves 13, 14, respectively, the outlet of the cathode chamber 16 communicates, via a pipeline 18, with an inlet of a filter 19 which has its outlet connected, via a valve 20, to the inlets of the anode chambers 17. Outlets of the anode chambers communicate with a pipeline 21 for the removal of the end product.

Water from the heater 12 is supplied in the form of two streams through the open valves 13 and 14 to the electrolyzer 15 constructed in accordance with the invention, into the cathode chamber 16 and two anode chambers 17. The valve 20 is shut. Water is fed from the cathode chamber 16, via the pipeline 18, to the filter 19. The valve 14 is then shut, the valve 20 is opened, and the softened catholyte, after the separation of precipitating hardness salts in the filter 19, is fed from the outlet of the filter 19, via the valve 20, to the anode chambers 17 for final softening, while starting water (hard water) continues to be admitted to the cathode chamber 16 from the heater 12 through the open valve 13. Hardness of catholyte, after the separation of precipitate in the filter 19, is from 2.6 to 3.9 mg-eq./l. Anolyte fed to the pipeline 21 in the form of the end product has a hardness of maximum 0.2 to 0.3 mg-eq./l.

Better understanding of the invention may be had from the following specific embodiments of the method for softening water, according to the invention.

EXAMPLE 1

Water with a hardness of 6.6 mg-eq./l was supplied in the form of three streams to the electrolyzer 15: two streams to the anode chambers 17 to obtain anolyte at the outlet and the third stream to the cathode chamber 16 to obtain catholyte from which precipitating hardness salts were separated by filtering. After the separation of hardness salts, pH of the catholyte was 11.3, and hardness of the catholyte was 3.9 mg-eq./l. Water supply to the anode chambers 17 was then interrupted, and starting water with the hardness of 6.6 mg-eq./l continued to be admitted to the cathode chamber 16. After purification of the catholyte occurred in the anode chambers 17, and hardness of the anolyte (end product) at the outlets of the anode chambers 17 was 0.3 mg-eq./l at pH = 6-7.

EXAMPLE 2

Starting water was softened as described in Example 1, with the only difference that starting water was heated in the heater 12° to 40° C. before supplying it to the cathode chamber 16. Hardness of the end product (anolyte) was lowered to 0.2 mg-eq./l, and power consumption for water softening decreased by 20-30%.

EXAMPLE 3 (comparison with the prior art)

Conditions for the electrochemical softening of water were the same as in Example 1, but catholyte was not supplied to the anode chambers 17 for afterpurification after the separation of hardness salts therefrom; it was rather mixed with anolyte to be used as the end product.

Hardness of catholyte was 0.55 mg-eq./l; hardness of anolyte was 2.1 mg-eq./l; hardness of the combined flow (end product) was $$\frac{0.55 + 2.1}{2} = 1.325 \text{ mg-eq./l.}$$

Therefore, the use of the flow of water preliminarily softened (in the form of catholyte) supplied to the anode chambers makes it possible to produce water with a hardness of 0.2 to 0.3 mg-eq./l in a single treatment stage. The lower limit can be achieved by heating starting water to 40° C. without additional power consumption as industrial effluents are generally heated to 40°-60° C. when they are supplied for softening.

The invention may be used in power engineering, chemistry, pharmaceutical industry and in other fields where water softening is required.

We claim:

1. A method for softening water by electrochemical treatment, comprising the steps of: causing water to pass in the form of two streams through a membrane electrolyzer; causing one stream to pass through an anode chamber to produce anolyte; causing the other stream to pass through a cathode chamber to produce catholyte from which precipitating hardness salts are separated; preliminarily softening the water stream to be fed to the anode chamber before supplying it to the anode chamber, by using at least a part of the catholyte stream after the separation of precipitating hardness salts therefrom, the anolyte being used as the end product.

* * * * *